(12) United States Patent
Bauer et al.

(10) Patent No.: US 9,937,488 B2
(45) Date of Patent: Apr. 10, 2018

(54) CATALYTIC EXTRUDED, SOLID HONEYCOMB BODY

(71) Applicant: Johnson Matthey Catalysts (Germany) GmbH, Redwitz (DE)

(72) Inventors: Juergen Bauer, Redwitz (DE); Ralf Dotzel, Redwitz (DE); Joerg Walter Jodlauk, Redwitz (DE); Rainer Leppelt, Redwitz (DE); Joerg Werner Muench, Redwitz (DE)

(73) Assignee: Johnson Matthey Catalysts (Germany) GmbH, Redwitz (DE)

( * ) Notice: Subject to any disclaimer, the term of this patent is extended or adjusted under 35 U.S.C. 154(b) by 0 days.

(21) Appl. No.: 15/113,323

(22) PCT Filed: Jan. 23, 2015

(86) PCT No.: PCT/GB2015/050150
§ 371 (c)(1),
(2) Date: Jul. 21, 2016

(87) PCT Pub. No.: WO2015/110822
PCT Pub. Date: Jul. 30, 2015

(65) Prior Publication Data
US 2017/0007991 A1    Jan. 12, 2017

(30) Foreign Application Priority Data
Jan. 23, 2014    (GB) .................................. 1401139.9

(51) Int. Cl.
| | |
|---|---|
| *B01J 29/76* | (2006.01) |
| *B01J 29/00* | (2006.01) |
| *B01J 29/04* | (2006.01) |
| *B01J 35/04* | (2006.01) |
| *B01J 37/00* | (2006.01) |
| *B01D 53/94* | (2006.01) |
| *B01J 37/02* | (2006.01) |
| *B01J 21/12* | (2006.01) |
| *B01J 21/16* | (2006.01) |
| *B01J 35/06* | (2006.01) |
| *B01J 37/04* | (2006.01) |
| *F01N 3/08* | (2006.01) |
| *F01N 3/10* | (2006.01) |
| *F01N 3/20* | (2006.01) |
| *F01N 3/28* | (2006.01) |
| *B01J 37/32* | (2006.01) |
| *C04B 38/00* | (2006.01) |
| *C04B 111/00* | (2006.01) |

(52) U.S. Cl.
CPC ........ *B01J 29/763* (2013.01); *B01D 53/9418* (2013.01); *B01J 21/12* (2013.01); *B01J 21/16* (2013.01); *B01J 29/005* (2013.01); *B01J 29/049* (2013.01); *B01J 35/04* (2013.01); *B01J 35/06* (2013.01); *B01J 37/0009* (2013.01); *B01J 37/0018* (2013.01); *B01J 37/0215* (2013.01); *B01J 37/04* (2013.01); *F01N 3/0814* (2013.01); *F01N 3/0842* (2013.01); *F01N 3/103* (2013.01); *F01N 3/2066* (2013.01); *F01N 3/2835* (2013.01); *B01D 2251/2062* (2013.01); *B01D 2255/2092* (2013.01); *B01D 2255/20738* (2013.01); *B01D 2255/20761* (2013.01); *B01D 2255/30* (2013.01); *B01D 2255/50* (2013.01); *B01D 2257/404* (2013.01); *B01J 37/32* (2013.01); *B01J 2229/186* (2013.01); *B01J 2229/42* (2013.01); *C04B 38/0006* (2013.01); *C04B 2111/0081* (2013.01); *F01N 2330/30* (2013.01)

(58) Field of Classification Search
CPC ............ B01D 53/9409; B01D 53/9413; B01D 53/9418; B01D 2255/00; B01D 2255/20761; B01D 2255/50; B01D 2257/402; B01D 2257/404; B01D 2258/012; F01N 3/28; F01N 3/2803; F01N 3/2066
See application file for complete search history.

(56) References Cited

U.S. PATENT DOCUMENTS

| | | |
|---|---|---|
| 4,735,927 A | 4/1988 | Gerdes et al. |
| 5,958,818 A | 9/1999 | Demmel et al. |
| 6,521,559 B1 | 2/2003 | Long et al. |
| 8,323,600 B2 * | 12/2012 | Thogersen ......... B01D 53/9418 423/213.2 |
| 8,459,138 B2 | 6/2013 | Zubiate et al. |
| 2005/0085383 A1 * | 4/2005 | Hoj .................... B01D 53/8628 502/412 |

(Continued)

FOREIGN PATENT DOCUMENTS

| | | | | |
|---|---|---|---|---|
| EP | 2324920 A1 | 9/2010 | | |
| GB | 2469581 A | 10/2010 | | |
| GB | 2482094 A | 1/2012 | | |
| JP | 05228371 A | * | 9/1993 | ............. B01D 53/94 |
| WO | WO 2008106519 A1 | * | 9/2008 | ........ B01D 53/9418 |
| WO | WO 2009080155 A1 | * | 7/2009 | ............ B10J 21/063 |
| WO | 2013126619 A1 | 8/2013 | | |
| WO | 2013182255 A1 | 12/2013 | | |

OTHER PUBLICATIONS

Lachman et al.; Extruded Monolithic Catalyst Supports; Catalysis Today, 14 (1992) 317-329.

*Primary Examiner* — Timothy C Vanoy

(57) ABSTRACT

An extruded, solid honeycomb body comprises a copper-promoted, small pore, crystalline molecular sieve catalyst for converting oxides of nitrogen in the presence of a reducing agent, wherein the crystalline molecular sieve contains a maximum ring size of eight tetrahedral atoms, which extruded, solid honeycomb body comprising: 20-50% by weight matrix component comprising diatomaceous earth, wherein 2-20 weight % of the extruded, solid honeycomb body is diatomaceous earth; 80-50% by weight of the small pore, crystalline molecular sieve ion-exchanged with copper; and 0-10% by weight of inorganic fibers.

22 Claims, No Drawings

(56) References Cited

U.S. PATENT DOCUMENTS

2007/0259770 A1   11/2007  Hofmann et al.
2010/0295218 A1   11/2010  Dotzel et al.
2015/0151293 A1*  6/2015  Lemus-Yegres ..... B01J 37/0228
                                                  502/65
2017/0144143 A1*  5/2017  Bauer ................. B01J 37/0009

* cited by examiner

CATALYTIC EXTRUDED, SOLID HONEYCOMB BODY

CROSS-REFERENCE TO RELATED APPLICATIONS

This application is a national stage (35 USC 371) of PCT/GB2015/050150 which claims priority to Great Britain Application No. 1401139.9, filed Jan. 23, 2014, which is incorporated herein by reference.

FIELD OF THE INVENTION

The present invention relates to an extruded, solid honeycomb body comprising a copper-promoted, small pore, crystalline molecular sieve catalyst for converting oxides of nitrogen in the presence of a reducing agent, preferably a nitrogenous reducing agent, e.g. $NH_3$. That is a so-called selective catalytic reduction (SCR) catalyst or $NH_3$—SCR catalyst.

BACKGROUND

WO 2008/106519 discloses a selective catalytic reduction catalyst comprising: a zeolite having the CHA crystal structure and a mole ratio of silica to alumina greater than about 15 and an atomic ratio of copper to aluminium exceeding about 0.25. In one embodiment, the SCR catalyst can be in the form of a honeycomb monolith formed of the SCR catalyst composition.

SUMMARY OF THE INVENTION

The inventors have now found, very surprisingly, that by using diatomaceous earth as a constituent of the matrix component in an extruded, solid honeycomb body comprising a copper promoted small pore, crystalline molecular sieve catalyst, the selective catalytic reduction activity of the catalyst is improved, particularly at relatively low temperatures (e.g. 200-300° C.) compared to an equivalent catalyst without diatomaceous earth as indicated by a comparison of catalyst activity normalised by weight of the copper promoted small pore, crystalline molecular sieve catalyst present in the extruded, solid honeycomb body.

DETAILED DESCRIPTION OF THE INVENTION

According to a first aspect the invention provides an extruded, solid honeycomb body comprising a copper-promoted, small pore, crystalline molecular sieve catalyst for converting oxides of nitrogen in the presence of a reducing agent, wherein the crystalline molecular sieve contains a maximum ring size of eight tetrahedral atoms, which extruded, solid honeycomb body comprising: 20-50% by weight matrix component comprising diatomaceous earth, wherein 2-20 weight % of the extruded, solid honeycomb body is diatomaceous earth; 80-50% by weight of the small pore, crystalline molecular sieve ion-exchanged with copper; and 0-10% by weight of inorganic fibres.

The honeycomb body comprises an array of parallel channels defined in part by cell walls extending from a first end to a second end thereof in the so-called "flow through" arrangement. The cell wall cross section is typically square, but any particular cross section is envisaged, such as triangular, hexagonal, octagonal or an asymmetric combination thereof, e.g. of octagonal and square cross-sections.

Diatomaceous earth also known as D.E., diatomite, or kieselgur/kieselguhr, is a naturally occurring, soft, siliceous sedimentary rock that is easily crumbled into a fine white to off-white powder. It has a particle size ranging from less than 3 micrometers to more than 1 millimeter, but typically 5 to 200 micrometers. The typical chemical composition of oven-dried diatomaceous earth is 80 to 95% silica, with 2 to 4% alumina (attributed mostly to clay minerals) and 0.5 to 2% iron oxide. Diatomaceous earth consists of fossilized remains of diatoms, a type of hard-shelled algae and these are visible in the product according to the invention using microscopy.

A molecular sieve is a material with very small holes of precise and uniform size. These holes are small enough to block large molecules while allowing small molecules to pass. Pillared clays can be regarded as molecular sieves, but without regular 3-dimensional network structure. Non-aluminosilicate zeolites (e.g. SAPOs) and aluminosilicate zeolites are examples of molecular sieves with regular 3-dimensional network structures with application in the present invention.

The matrix component is generally an inert filler. Preferably, the matrix component in the extruded, solid honeycomb body comprises alumina, clay or both alumina and clay. One purpose of the matrix component is to provide a framework for the extruded, solid honeycomb body, so the type of matrix component and its content in the extruded, solid honeycomb body are selected to impart a desired strength in the end product, in combination with inorganic fibres (where present). Some matrix components can also contribute desirable properties to assist in manufacture. So, for example, clays are inherently plastic so their addition to a composition to be extruded can enable or promote a desired level of plasticity or binding in an extrusion mixture improving the paste flow and hence extrusion properties.

It can be difficult (but not impossible) using current techniques to identify individual constituents in the matrix component in a finished extruded, solid honeycomb body because the matrix component can form a silicate dispersion ceramic. A silicate dispersion ceramic comprises an intimate mixture of small particles. Depending on the size of the particles, it may be possible to distinguish between, e.g. alumina and silicates or clay minerals and thereby determine the composition of a solid honeycomb body. Suitable analysis techniques that may assist in identifying individual non-diatomaceous earth constituents in the matrix component include Energy Dispersion X-ray spectroscopy (EDX). However, it is possible to identify the presence of diatomaceous earth as mentioned above.

However, preferably, at least some of the clay is present in the extruded, solid honeycomb body as a pillared clay, more specifically a pillared clay mineral component, such as kaolin type clays, smectite type clays, fullers earth, anionic clays (layered double hydroxides), sepiolite or a mixtures of any two or more thereof In contrast to identification of particular non-pillared clays discussed hereinabove, pillared clay mineral components in the extruded, solid honeycomb body according to the invention are easily identifiable because they have an XRD pattern showing clearly the door line (basal spacing) as a "signature". The kaolin can be chosen from subbentonite, anauxite, halloysite, kaolinite, dickite, nacrite and mixtures of any two of more thereof; the smectite can be selected from the group consisting of montmorillonite (e.g. hectorite), nontronite, vermiculite, saponite and mixtures of any two or more thereof; and the fullers earth can be montmorillonite or palygorskite (attapulgite). Particularly preferably, the pillared clay mineral component comprises pillared kaolin minerals and/or pillared bentonite minerals.

Pillaring is the procedure of transforming a layered crystalline inorganic compound, such as a clay mineral, into a material having chemically and thermally stable microporosity (IUPAC notation <2 nm) and/or mesoporosity (IUPAC notation 2-50 nm), identifiable by an XRD pattern. In the procedure a guest species (pillaring agent) is introduced between layers of the clay mineral while retaining the layered structure of the clay minerals. A pillared clay mineral can be defined by the following characteristics: (i) the layers are propped apart vertically and do not collapse upon removal of solvent carrying the guest species; (ii) the minimum increase in basal spacing is the diameter of the $N_2$ molecule, commonly used to measure surface areas and pore volumes: 0.315±0.353 nm; (iii) the pillaring agent has molecular dimensions and is laterally spaced in an interlamellar space on a molecular length scale; (iv) the interlamellar space is porous and at least accessible to molecules as large as $N_2$; there is no upper limit to the size of the pores. Pillared clay minerals can be distinguished from ordinary clays including guest species between layers of the clay mineral because a pillared clay mineral has an intracrystalline porosity derived from a lateral separation of the pillaring agent.

Pillaring agents include inorganic and organic compounds. Organic compounds include those having amino, olefin and epoxy groups, e.g. imidazolium pillaring agents and inorganic hydrated polyoxocations derived from, e.g. polyhydroxyaluminum pillaring agents, or iron benzoate. Inorganic pillaring agents may be large metal—(e.g. Al, Fe, Ti, Zr, Cr, Ga, Ce, Ta, La)—polyoxocations formed in solution or silanes (e.g. 3-aminopropyltrimethoxy-silane (APTMS) and 2-(2-trichlorosilylethyl)pyridine (TCSEP)). See also U.S. Pat. No. 6,521,559.

Although optional according to the first aspect of the invention, preferably the extruded, solid honeycomb body according to the invention comprises inorganic fibres. An advantage of using inorganic fibres is to improve extrudability, to maintain the shape of the part during drying (although this may not be necessary if microwave drying is used, because microwave drying is quicker), but primarily for stability of the product (i.e. fibre reinforcement) which can enable extrusion of longer parts and/or parts having a wider cross section and/or for use in applications where the catalyst may be shaken, e.g. vehicular uses.

Preferably, the inorganic fibres are E-glass fibres or basalt fibres. E-glass fibres can be defined as alumino-borosilicate glass with less than 1% w/w alkali oxides. Basalt fibre is a material made from extremely fine fibres of basalt, which is composed of the minerals plagioclase, pyroxene, and olivine.

A length of the inorganic fibres selected for use can be a compromise between improved extrudability and improved product stability, i.e. shorter fibres improves extrudability but reduces stability and vice versa. Preferably, however, a fibre length distribution present in the extruded, solid honeycomb body of the present invention is from 150 to 700 μm (Gaussian distribution), preferably from 200 to 500 μm with a mean of approximately 300 μm. Such fibre lengths can be introduced in practice by adding fibres of longer lengths, e.g. of approximately 6 mm or approximately 1 mm by pre-milling the 6 mm long lengths, to a plastic mixture according to a method of manufacture of the invention and then using various mixing parameters to achieve the desired fibre length distribution in the finished product. Such mixing parameters can include the selection of mixing blade, mixing blade speed, a gap between the blades, use of a kneader or a twin kneader instead of blades, water content of the mixture, duration of mixing etc.

The small pore, crystalline molecular sieve can be an aluminosilicate zeolite, a metal-substituted aluminosilicate zeolite or a non-zeolite aluminophosphate molecular sieve. The non-zeolite aluminophosphate molecular sieve can be an aluminophosphate (AlPO), a metal substituted zeolites (MeAlPO), a silico-aluminophosphate (SAPO) zeolites or a metal substituted silico-aluminophosphate (MeAPSO). Suitable substituent metals include one or more of, without limitation, As, B, Be, Co, Cu, Fe, Ga, Ge, Li, Mg, Mn, Zn and Zr, preferably Cu.

Small pore, crystalline molecular sieves with application in the present invention can include those that have been treated to improve hydrothermal stability. Illustrative methods of improving hydrothermal stability include:

(i) Dealumination by: steaming and acid extraction using an acid or complexing agent e.g. (EDTA—ethylenediaminetetracetic acid); treatment with acid and/or complexing agent; treatment with a gaseous stream of $SiCl_4$ (replaces Al in the zeolite framework with Si);

(ii) Cation exchange—use of multi-valent cations such as La; and (iii) Use of phosphorous containing compounds (see e.g. U.S. Pat. No. 5,958,818).

Preferably, the small pore, crystalline molecular sieve is not a silico-alumino phosphate molecular sieve or a non-zeolite aluminophosphate molecular sieve. This is partly because silico-aluminophosphates can adsorb large amount of water molecules in use leading to contraction of the crystal unit cell and an associated re-expansion as water is desorbed therefrom, which can lead to cracking in the extruded, solid honeycomb body. Water adsorption in a silico-aluminophosphate can also reduce $NO_x$ reduction activity.

Most preferably, the small pore, crystalline molecular sieves for use in the present invention are aluminosilicate zeolites.

Preferably, the small-pore, crystalline molecular sieve in the extruded, solid honeycomb body according to the invention has the CHA, ERI, FER, AFX or AEI crystal structure, preferably CHA and/or AEI.

Isotypes having the CHA crystal structure for use in the present invention include AlPO-34, CoAPO-47, DAF-5, GaPO-34, LZ-218, Linde D, Linde R, MeAPO-47, MeAPSO-47, Phi, SAPO-34, SAPO-47, SSZ-13 (an aluminosilicate), SSZ-62 (an aluminosilicate), UiO-21, ZK-14 and ZYT-6. Preferably, the isotype having the CHA crystal structure is AlPO-34, SAPO-34, SSZ-13 or SSZ-62.

Isotypes having the AFX crystal structure for use in the present invention include SAPO-56, MAPSO-56, where M is Co, Mn or Zr, and SSZ-16 (an aluminosilicate). Preferably, the isotype having the ERI crystal structure is SSZ-16.

Isotypes having the FER crystal structure for use in the present invention include [Bi—Si—O]-FER, [Ga—Si—O]-FER, [Si—O]-FER, FU-9, ISI-6, Monoclinic ferrierite, NU-23, Sr-D and ZSM-35. Preferably, the isotype having the FER crystal structure is ZSM-35.

Isotypes having the ERI crystal structure for use in the present invention include AlPO-17, LZ-220, Linde-T and UZM-12.

Isotypes having the AEI crystal structure for use in the present invention include AlPO-18, [Co—Al—P—O]-AEI, SAPO-18, SIZ-8 and SSZ-39 (an aluminosilicate). Preferably, the isotype having the AEI crystal structure is SSZ-39.

Preferably, the small pore, crystalline molecular sieve in the extruded, solid honeycomb body has a silica-to-alumina ratio of 10-50, such as 15-40 or 20-35.

The small pore, crystalline molecular sieve catalyst in the extruded, solid honeycomb body according to the invention is promoted with copper. The copper can be introduced into the small pore, crystalline molecular sieve by ion exchange, impregnation, isomorphous substitution etc. It is preferred in an extruded, solid honeycomb body according to the invention that the copper component is ion-exchanged in the small pore, crystalline molecular sieve. Ion-exchange can be performed by known techniques including solid-state ion exchange (e.g. milling a combination of powdered copper compound and hydrogen form of a molecular sieve and heating in an inert atmosphere) or "wet" ion-exchange, e.g. by combining an ammonium or hydrogen form of the small pore molecular sieve with a solution of a copper compound, e.g. copper nitrate, copper sulphate or copper acetate, preferably copper acetate.

The copper which has been ion-exchanged in the small pore, crystalline molecular sieve can be ion-exchanged prior to mixing with the matrix component (i.e. pre-forming) and/or the copper component can be added as an ion-exchange precursor to the mixture. The copper component may also be present as "free copper", e.g. unexchanged CuO particles.

It is preferred that the total wt % of copper in the small pore, crystalline molecular sieve is 1.0-5.0 wt % (inclusive) copper, such as 2.0-4.0 wt % (inclusive), most preferably 2.5-3.5 wt % (inclusive).

The quantity of copper promoter in the copper-promoted small pore, crystalline molecular sieve catalyst can be expressed as an atomic ratio of copper to aluminium.

Preferably, the atomic ratio of copper to aluminium is 0.06-1.22. This range is not arbitrarily chosen. When the silica-to-alumina ratio (SAR) of the small pore, crystalline molecular sieve is 10 and the copper loading is 1.0 wt %, the copper to aluminium atomic ratio is 0.06; whereas when the SAR is 50 and the copper loading is 5.0 wt %, the copper to aluminium atomic ratio is 1.22. An equation for determining the copper to aluminium atomic ratio from known SAR and copper loading expressed as a weight percent can be expressed as:

$$Cu/Al\ atomic = X/63.5/(1 \times 2/(SAR \times 60 + 102)),$$

where "X" is the wt % of copper.

It is preferred in the extruded, solid honeycomb body according to the invention that the diatomaceous earth contains iron oxide, wherein a weight ratio of Fe:Cu in the extruded, solid honeycomb body can be 1:5-1:20, preferably 1:8-1:15, most preferably about 1:12.

A wall porosity of the extruded, solid honeycomb body can be from 40-60%, and is preferably >50%. Porosity can be determined by mercury porosimetry.

A cell wall thickness of the extruded, solid honeycomb body can be 150-250 μm, such as 175-225 μm. The inventors have found that if the cell wall thickness is much less than 200 μm, $NO_x$ reduction activity can be reduced. Additionally, the inventors found that as the cell wall thickness is increased much above 200 μm, $NO_x$ conversion is not significantly improved (i.e. mass transfer limitation effect), but at undesirable increased backpressure when in use in an exhaust system (i.e. reduced open frontal area (OFA) of the extruded, solid honeycomb body).

The cell density of the extruded, solid honeycomb body according to the invention can be >62 cells $cm^{-2}$ (>400 cells per square inch (cpsi)), preferably 155 cells $cm^{-2}$ (1000 cpsi) or >62 cells $cm^{-2}$ (>400 cpsi) or more, such as 93 cells $cm^{-2}$ (600 cpsi) or more to 124 cells $cm^{-2}$ (800 cpsi) or less, most preferably about 93 cells $cm^{-2}$ (600 cpsi). The inventors found that for the same cell wall thickness, a 93 cells $cm^{-2}$ (600 cpsi) extruded, solid honeycomb body had better performance than the same formulation extruded at 62 cells $cm^{-2}$ (400 cpsi). Although an increase in cell density should be balanced with any increase in backpressure due to a corresponding decrease in OFA (assuming the cell wall thickness remains constant), the $NO_x$ reduction activity was significant enough that higher cell densities were preferred.

The extruded, solid honeycomb body according to the invention can be coated with a catalytic coating.

One or more catalytic coating can be for oxidising $NH_3$ to $N_2$. Such a catalyst is often called an ammonia slip catalyst or ASC. Suitable ASCs can comprise a relatively low loading, such as 14.2-28.3 g/l (0.5-10 g/ft$^3$), of platinum group metal, e.g. platinum or both platinum and palladium, supported on a suitable particulate metal oxide support material, such as alumina. In a particularly preferred ASC, the relatively low loading of platinum group metal/particulate metal oxide support material is applied in a first layer directly on a surface of the extruded solid honeycomb body, and a catalytic coating for converting $NO_x$ using a nitrogenous reductant, i.e. a selective catalytic reduction catalyst, is applied as a second layer directly on the first layer. The selective catalytic reduction (SCR) catalyst can be a vanadia-based SCR catalyst such as $V_2O_5/TiO_2$ or $V_2O_5/WO_3/TiO_2$; or a crystalline molecular sieve promoted with a transition metal, such as copper and/or iron. The preferred, two layer arrangement promotes greater selectivity for $N_2$.

So as not to interfere with a primary purpose of the extruded, solid honeycomb body, which is for converting oxides of nitrogen in the presence of a reducing agent, the ASC is preferably coated on a zone to be disposed to a downstream side of an exhaust system when in use. The zone is of substantially uniform length defined at one end by a first end of the extruded, solid honeycomb body and at another end by a length to a maximum of 50% (≤40% or ≤30% such as ≤20%) of a total length of the extruded, solid honeycomb body measured from the first end.

One or more catalytic coating can be for converting $NO_x$ using a nitrogenous reductant, i.e. a selective catalytic reduction (SCR) catalyst. The SCR catalyst can be a vanadia-based SCR catalyst such as $V_2O_5/TiO_2$ or $V_2O_5/WO_3/TiO_2$; or a crystalline molecular sieve, preferably an aluminosilicate zeolite, promoted with a transition metal, such as copper and/or iron. Preferably, a copper and/or iron promoted crystalline molecular sieve catalyst is used, in which case the catalyst can be the same as or different from the extruded catalyst. Preferred crystalline molecular sieves include those having the CHA, AEI, FER, MFI or BEA crystal structures. Small pore molecular sieves, i.e. those having a maximum ring size of eight tetrahedral atoms, are preferred.

The ASC and the SCR catalyst coatings can be combined, wherein a zone intended to be disposed to an upstream side in an exhaust system when in use can be coated with the SCR catalyst and a zone intended to be disposed to a downstream side when in use can be coated with the ASC. Preferably there is no gap between the SCR catalyst coating and the ASC.

According to a second aspect, the invention provides an exhaust system comprising an extruded, solid honeycomb body according to any preceding claim.

The exhaust system preferably comprises an injector for injecting a nitrogenous reductant into a flowing exhaust gas upstream of the extruded, solid honeycomb body. However, $NH_3$ can also be generated in situ by contacting an upstream $NO_x$ absorber catalyst with a rich exhaust gas, such as is periodically generated to regenerate a $NO_x$ absorber catalyst, e.g. $Ba(NO_3)_2+8H_2 \rightarrow BaO+2NH_3+5H_2O$.

The exhaust system can also comprise an oxidation catalyst or a $NO_x$ absorber catalyst for inter alia oxidising nitrogen monoxide to nitrogen dioxide disposed on a separate substrate upstream of the extruded, solid honeycomb body. SCR catalysts catalyse the reactions of (i) $4NH_3+ 4NO+O_2 \rightarrow 4N_2+6H_2O$ (i.e. 1:1 $NH_3:NO$); (ii) $4NH_3+2NO+ 2NO_2 \rightarrow 4N_2+6H_2O$ (i.e. 1:1 $NH_3:NO_x$; and (iii) $8NH_3+ 6NO_2 \rightarrow 7N_2+12H_2O$ (i.e. 4:3 $NH_3:NO_x$). Reaction (ii) is quickest and promotes low temperature $NO_x$ reduction. Reaction (i) is next quickest. In order to obtain $NO_2$ to promote reaction (ii) it can be desirable to oxidise NO to $NO_2$ upstream of the extruded, solid honeycomb body according to the invention.

According to a third aspect, the invention provides an internal combustion engine comprising an exhaust system according to the second aspect of the invention.

According to a fourth aspect, the invention provides a vehicle comprising an internal combustion engine according to the third aspect of the invention.

According to a fifth aspect, the invention provides a method of converting oxides of nitrogen ($NO_x$) in a gas comprising adding a nitrogenous reductant to the gas to produce a gas mixture; and contacting the gas mixture with an extruded, solid honeycomb body according to the first aspect of the invention.

According to a sixth aspect, the invention provides for the use of an extruded, solid honeycomb body according to the first aspect of the invention for converting oxides of nitrogen ($NO_x$) in a gas with a nitrogenous reductant.

According to a seventh aspect, the invention provides a method of making an extruded, solid honeycomb body comprising the steps of: (a) forming a plastic mixture by mixing and/or kneading together a powdered diatomaceous earth matrix component; powdered additional matrix component; powdered small pore, crystalline molecular sieve, wherein the small pore, crystalline molecular sieve contains a maximum ring size of eight tetrahedral atoms; a copper component; optional inorganic fibres; and an acid or alkaline aqueous solution, wherein the copper component comprises copper which has been ion-exchanged in the small pore, crystalline molecular sieve prior to the mixing step and/or the copper component is added as an ion-exchange precursor to the mixture, wherein the powdered small pore, crystalline molecular sieve is added to the mixture as the $H^+$ or $NH_4^+$ form thereof and the small pore, crystalline molecular sieve is ion-exchanged with the copper in situ; (b) extruding the plastic mixture into a wet honeycomb body, drying the extruded honeycomb body and calcining it to form an extruded, solid honeycomb body; and (c) selecting quantitative proportions of the starting materials such that the extruded, solid honeycomb body contains 20-50% by weight matrix component comprising diatomaceous earth, wherein 2-20 weight % of the extruded, solid honeycomb body is diatomaceous earth; 80-50% by weight of the small pore, crystalline molecular sieve ion-exchanged with copper; and 0-10% by weight of inorganic fibres.

The "wet" extruded material can be dried and calcined using standard techniques, including freeze drying and microwave drying (see WO2009/080155).

Preferably, the additional matrix component in the extruded, solid honeycomb body comprises alumina. The alumina can be derived from an alumina precursor, such as boehmite, which is included in the plastic mixture of the method; and/or is added as such, preferably as an alumina sol, which improves strength in the extruded, solid honeycomb body.

Preferably, the method comprises including clay in the plastic mixture as an additional matrix component. Most preferably, the additional matrix component comprises both alumina and clay. The clay is preferably a combination of bentonite, kaolin and a fire clay. The United States Environmental Protection Agency defines fire clay very generally as a "mineral aggregate composed of hydrous silicates of aluminium ($Al_2O_3.2SiO_2.2H_2O$) with or without free silica". To be referred to as a "fire clay" the material must withstand a minimum temperature of 1515° C. (2759° F.). Fire clays range from flint clays to plastic fire clays, but there are semi-flint and semi-plastic fire clays as well. Fire clays consist of natural argillaceous materials, mostly Kaolinite group clays, along with fine-grained micas and quartz, and may also contain organic matter and sulphur compounds. It is preferred to use clays having the lowest content of alkali metals possible as the resulting catalytic activity is improved, particularly at relatively low temperatures.

It is preferable for the fire clay to be in a majority by weight % relative to the total quantity of clay present. This is because fire clay can add plasticity (for improved extrusion behaviour) to the mixture, but shrinks less upon drying and calcination than bentonite clay minerals.

The copper component can be added as an ion-exchange precursor to the mixture, wherein the ion-exchange precursor can be copper nitrate, copper sulphate, copper oxide or copper acetate, but is preferably copper acetate.

Organic auxiliary agents are used to improve processing or to introduce desirable attributes in the finished product but are burnt out during the calcination step. Such materials can improve processing plasticity but also improve porosity in the finished product, and therefore mass transfer in the product when in use, because they are burnt out during calcination, leaving behind a void. Organic auxiliary agents suitable for use in the method according to the seventh aspect of the invention comprise at least one of acrylic fibres (extrusion aid and pore former), a cellulose derivative (plasticizer and/or drying aid), other organic plasticizers (e.g. polyvinyl alcohol (PVA) or polyethylene oxide (PEO)), a lubricant (extrusion aid) and a water-soluble resin.

In order that the invention may be more fully understood the following Examples are provided by way of illustration only.

EXAMPLES

Example 1 and Comparative Example

Two extruded zeolite monolith substrate was made according to methods similar to those disclosed in U.S. Pat. No. 7,507,684: a Comparative Example and an example according to the invention (Example 1). For the comparative example, powdered copper-exchanged aluminosilicate CHA zeolite was mixed with clay minerals and powdered synthetic boehmite alumina (Pural) and was processed in an aqueous solution with a pH-value of 5-6 into a shapeable and flowable slip by admixture with carboxy methyl cellulose, the plasticizer/extrusion aid Zusoplast (a mixture of oleic acid, glycols, acids and alcohols (a brand name of Zschimmer & Schwarz GmbH & Co KG)) and the organic auxiliary agent PEO brandname Alkox (a polyethylene oxide) to provide, in combination with the diatomaceous earth and other matrix components, a desired level of porosity. The quantitative proportions of the starting materials were selected in such a way that the active material of the finished solid catalyst body contained 60% by weight of the CuCHA, 31% by weight of γ-Al$_2$O$_3$ and clay minerals and 10% by weight of glass fibres. The shapeable mixture was extruded into a flow-through honeycomb catalyst body, i.e. with continuous channels and with a circular cross-section having a cell density of 62 cells cm$^{-2}$ (400 cpsi (cells per square inch)). Subsequently, the catalyst body was freeze dried for 1 hour at 2 mbar according to the method described in WO 2009/080155 and calcined at a temperature of 580° C. to form a solid catalyst body.

For the example according to the invention, a quantity of commercially available diatomaceous earth was added to the mixture of the comparative example. The starting materials were selected in such a way that the active material of the finished solid catalyst body contained 58.5% by weight of the CuCHA, 23% by weight of γ-Al$_2$O$_3$ and clay minerals, 7% by weight of glass fibres and 12% by weight of diatomaceous earth. The catalyst body was extruded into the same cell density and cross section as the comparative example and was dried and calcined in the same way.

TABLE 1

| Component | Comparative Example % Weight | Example 1 % Weight |
|---|---|---|
| Cu-CHA-Zeolite | 60 | 58 |
| Al$_2$O$_3$ and Clays | 30 | 23 |
| Glass Fibers | 10 | 7 |
| Diatom. Earth (DE) | 0 | 12 |

Example 2—Catalyst Testing

Identical volume samples of the Comparative Example and Example 1 were tested in a synthetic catalytic activity test (SCAT) apparatus using the following inlet gas mixture at selected inlet gas temperatures: 100 ppm NO$_x$ (NO$_2$=0 ppm), 100 ppm NH$_3$, 7% H$_2$O, 9.4% O$_2$, balance N$_2$, space velocity 60,000 h$^{-1}$. The results for NO$_x$ conversion by honeycomb volume (X$_{NOx}$/V) and by honeycomb weight (X$_{NOx}$/M) at different temperatures are set out in Table 2.

TABLE 2

| DE Content [%] | X$_{NOx}$/V 180° C. [%/ml] | X$_{NOx}$/V 215° C. [%/ml] | X$_{NOx}$/V 300° C. [%/ml] | X$_{NOx}$/V 500° C. [%/ml] | X$_{NOx}$/M 180° C. [%/g] | X$_{NOx}$/M 215° C. [%/g] | X$_{NOx}$/M 300° C. [%/g] | X$_{NOx}$/M 500° C. [%/g] |
|---|---|---|---|---|---|---|---|---|
| 0 | 1.04 | 1.33 | 1.40 | 1.39 | 2.01 | 2.57 | 2.70 | 2.69 |
| 12 | 1.03 | 1.33 | 1.40 | 1.39 | 2.22 | 2.86 | 3.00 | 2.99 |
| % Difference | | | | | 10.2 | 11.2 | 11.1 | 11.2 |

From these results, it can be seen that the catalyst activity by unit volume of honeycomb is practically identical, despite the catalyst of Example 1 having 1.5 wt % less CuCHA present. However, when expressed as NO$_x$ conversion activity by unit of honeycomb weight (see % differences shown in Table 2), it can be seen that the catalyst according to Example 1 is more active than that of the Comparative Example. From these data, the inventors conclude that the addition of diatomaceous earth to an extrudate composition for a NH$_3$—SCR catalyst results in a more catalyst having increased NO$_x$ reduction activity.

For the avoidance of any doubt, the entire contents of all prior art documents cited herein is incorporated herein by reference.

The invention claimed is:

1. An extruded, solid honeycomb body comprising a copper-promoted, small pore, crystalline molecular sieve catalyst for converting oxides of nitrogen in the presence of a reducing agent, wherein the extruded, solid honeycomb body comprises:
   a matrix component comprising diatomaceous earth, wherein the matrix component is present in an amount of 20-50% by weight of the honeycomb body and wherein, 2-20 weight % of the extruded, solid honeycomb body is diatomaceous earth;
   a small pore, crystalline molecular sieve ion-exchanged with copper, present in an amount of 50-80% by weight of the honeycomb body; and
   inorganic fibres present in an amount of 0-10% by weight of the honeycomb body.

2. The extruded, solid honeycomb body of claim 1, wherein the matrix component comprises alumina and clay.

3. The extruded, solid honeycomb body of claim 2, wherein at least some of the clay is present as a pillared clay mineral.

4. The extruded, solid honeycomb body of claim 1, comprising inorganic fibres.

5. The extruded, solid honeycomb body of claim 4, wherein the inorganic fibres are E-glass fibres or basalt fibres.

6. The extruded, solid honeycomb body of claim 4, wherein the inorganic fibres have lengths from 150 to 700 μm and the lengths of the inorganic fibres are present in a Gaussian distribution.

7. The extruded, solid honeycomb body of claim 1, wherein the small pore, crystalline molecular sieve is an aluminosilicate zeolite.

8. The extruded, solid honeycomb body of claim 1, wherein the small-pore, crystalline molecular sieve has the CHA, ERI, FER, AFX or AEI crystal structure.

9. The extruded, solid honeycomb body of claim 1, wherein the small pore, crystalline molecular sieve has a silica-to-alumina ratio of from 10 to 50.

10. The extruded, solid honeycomb body of claim 1 comprising a total of 1.0-5.0 wt % copper.

11. The extruded, solid honeycomb body of claim 1, wherein an atomic ratio of copper to aluminium in the copper ion-exchanged small pore, crystalline molecular sieve is 0.06-1.22.

12. The extruded, solid honeycomb body of claim 1, wherein a cell wall thickness of the extruded, solid honeycomb body is 150-250 μm.

13. The extruded, solid honeycomb body of claim 1, wherein a cell density of the extruded, solid honeycomb body is >62 cells cm$^{-2}$ (>400 cells per square inch).

14. The extruded, solid honeycomb body of claim 1, wherein the extruded, solid honeycomb body is coated with a catalytic coating.

15. The extruded, solid honeycomb body of claim 14, wherein the catalytic coating oxidizes $NH_3$ to $N_2$ and/or converts $NO_x$ using a nitrogenous reductant.

16. An exhaust system comprising an extruded, solid honeycomb body of claim 1.

17. The exhaust system of claim 16 further comprising an injector that injects a nitrogenous reductant into a flowing exhaust gas upstream of the extruded, solid honeycomb body.

18. The exhaust system of claim 16 further comprising an oxidation catalyst or a $NO_x$ absorber catalyst for oxidising nitrogen monoxide to nitrogen dioxide, where the oxidation catalyst or NOx adsorber catalyst is disposed on a separate substrate upstream of the extruded, solid honeycomb body.

19. An internal combustion engine comprising an exhaust system of claim 16.

20. A vehicle comprising an internal combustion engine of claim 19.

21. A method of converting oxides of nitrogen ($NO_x$) in a gas comprising adding a nitrogenous reductant to the gas to produce a gas mixture; and contacting the gas mixture with an extruded, solid honeycomb body according to claim 1.

22. A method of making an extruded, solid honeycomb body comprising the steps of:
   (a) forming a plastic mixture by mixing and/or kneading together a powdered diatomaceous earth matrix component; powdered additional matrix component; powdered small pore, crystalline molecular sieve, wherein the small pore, crystalline molecular sieve contains a maximum ring size of eight tetrahedral atoms; a copper component; optional inorganic fibres; and an acid or alkaline aqueous solution, wherein the copper component comprises copper which has been ion-exchanged in the small pore, crystalline molecular sieve prior to the mixing step and/or the copper component is added as an ion-exchange precursor to the mixture, wherein the powdered small pore, crystalline molecular sieve is added to the mixture as the $H^+$ or $NH_4^+$ form thereof and the small pore, crystalline molecular sieve is ion-exchanged with the copper in situ;
   (b) extruding the plastic mixture into a wet honeycomb body, drying the extruded honeycomb body and calcining it to form an extruded, solid honeycomb body; and
   (c) selecting quantitative proportions of the starting materials such that the extruded, solid honeycomb body contains 20-50% by weight matrix component comprising diatomaceous earth, wherein 2-20 weight % of the extruded, solid honeycomb body is diatomaceous earth; 80-50% by weight of the small pore, crystalline molecular sieve ion-exchanged with copper; and 0-10% by weight of inorganic fibres.

\* \* \* \* \*

UNITED STATES PATENT AND TRADEMARK OFFICE
CERTIFICATE OF CORRECTION

| | |
|---|---|
| PATENT NO. | : 9,937,488 B2 |
| APPLICATION NO. | : 15/113323 |
| DATED | : April 10, 2018 |
| INVENTOR(S) | : Juergen Bauer et al. |

It is certified that error appears in the above-identified patent and that said Letters Patent is hereby corrected as shown below:

On the Title Page

ITEM [71], Applicant:
"Johnson Matthey Catalysts (Germany) GmbH, Redwitz (DE)" should read -- Johnson Matthey Public Limited Company, London (GB) --.

Signed and Sealed this
Thirty-first Day of January, 2023

Katherine Kelly Vidal
*Director of the United States Patent and Trademark Office*